Figure 1:
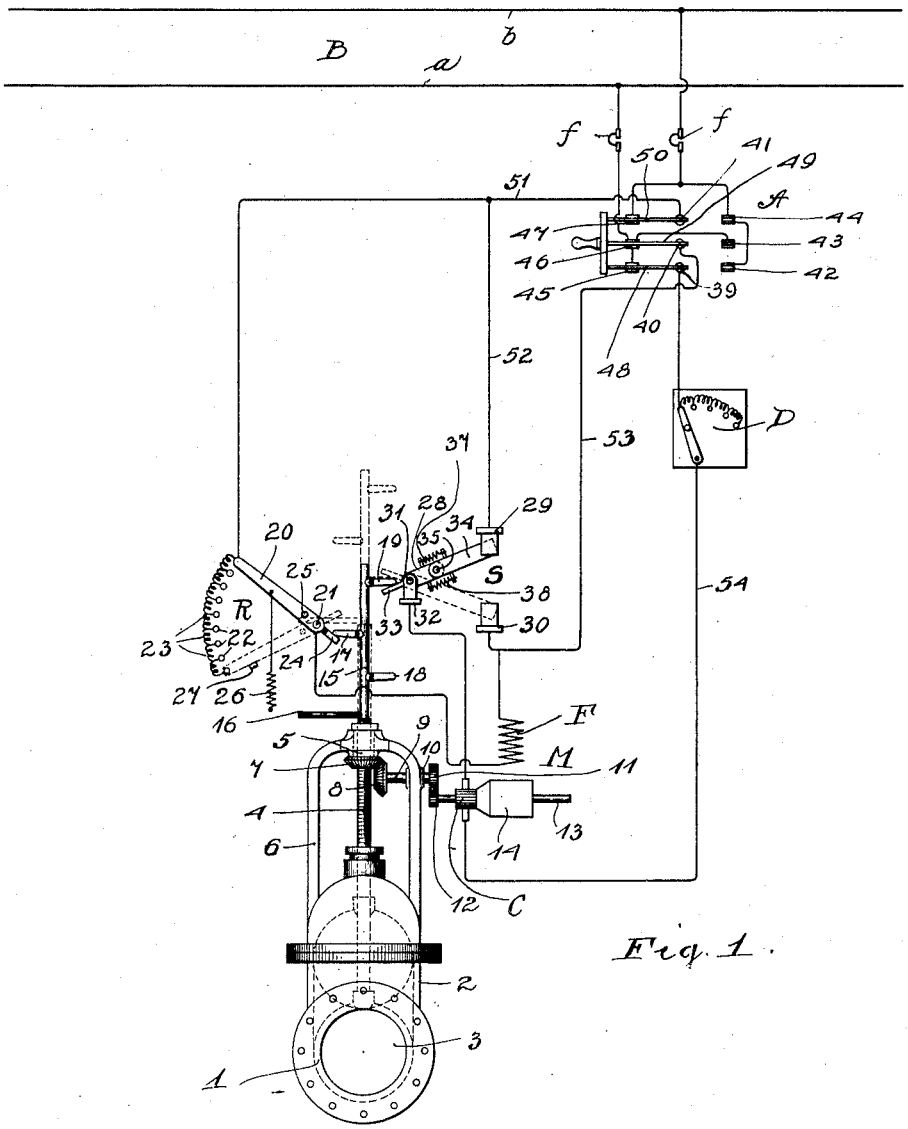

No. 887,253. PATENTED MAY 12, 1908.
W. B. JACKSON.
VALVE OPERATING MECHANISM.
APPLICATION FILED OCT. 6, 1905.

3 SHEETS—SHEET 1.

Witnesses:
Leonard W. Novander
Charles J. Schmidt,

Inventor
William B. Jackson
By Charles A. Brown
Attorney

UNITED STATES PATENT OFFICE.

WILLIAM B. JACKSON, OF MADISON, WISCONSIN, ASSIGNOR TO HIMSELF AND DUGALD C. JACKSON, OF MADISON, WISCONSIN, A COPARTNERSHIP.

VALVE-OPERATING MECHANISM.

No. 887,253.      Specification of Letters Patent.      Patented May 12, 1908.

Application filed October 6, 1905. Serial No. 281,615.

*To all whom it may concern:*

Be it known that I, WILLIAM B. JACKSON, citizen of the United States, residing at Madison, in the county of Dane and State of Wisconsin, have invented a certain new and useful Improvement in Valve-Operating Mechanism, of which the following is a full, clear, concise, and exact description, reference being had to the accompanying drawings, forming a part of this specification.

My invention relates to valve operating mechanism, particularly to electrical operating mechanism for controlling the opening and closure of large valves controlling water flow through pipes or penstocks.

The pressure of the water through the pipes and penstocks is sometimes very great and considerable power is necessary to start the valve gates from a state of rest. Great precaution must also be exercised in opening and closing valves to prevent water hammer. When the valve gate is to be opened from its closed position it must be moved very slowly at first to allow the water to escape gradually and to prevent destructive currents or water hammer. When the valve has been sufficiently opened and the water has assumed a more natural flow the motion of the valve may be accelerated. Upon closure of the valve the motion of the gate should be rather slow at the start or destructive results will follow from the sudden pressure exerted against the valve gate suddenly thrust into the path of the water. After the gate has been started a sufficient distance it may be accelerated in speed until almost closed when its motion should again be retarded and complete closure effected under very slow motion. If this is not done the sudden interruption of the water flow will cause water hammer. In my invention I obtain this required control of the valve by means of electrical controlling apparatus for an electric motor which is in driving relation with the valve gate and the circuits of which apparatus and motor may be controlled by a single switch actuated by the operator. The switch serves merely to control the current flow to the apparatus and motor and to change the direction of rotation of the motor, the controlling apparatus for the motor being entirely automatic in its operation. The valve then with its controlling apparatus may be at any distance from the controlling switch and the valve will be efficiently operated without continual attendance. The controlling apparatus is so arranged that the motor is automatically constrained to start with great power and to accelerate slowly and to be automatically stopped at the end of motion of the valve, and particularly to cause the final closure of the valve to be made at very slow speed and with great power.

Figure 2:
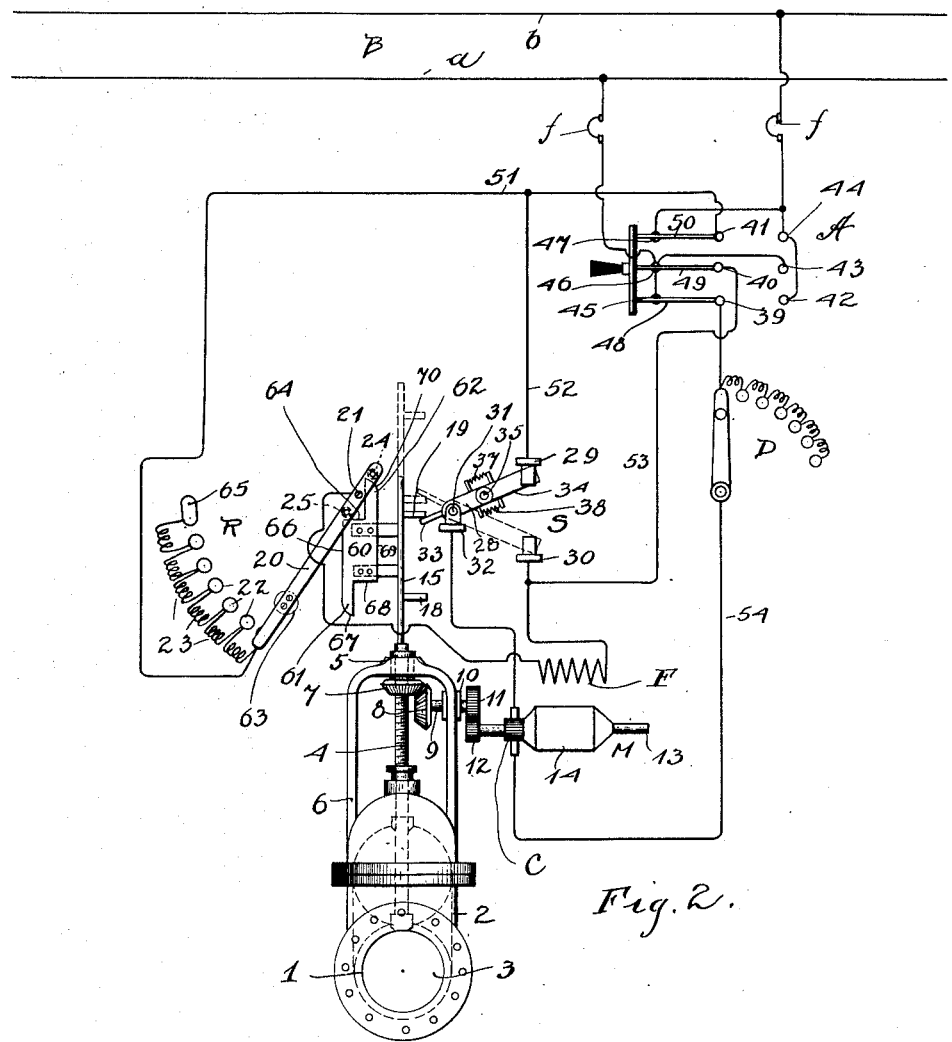
Figures 3, 4:
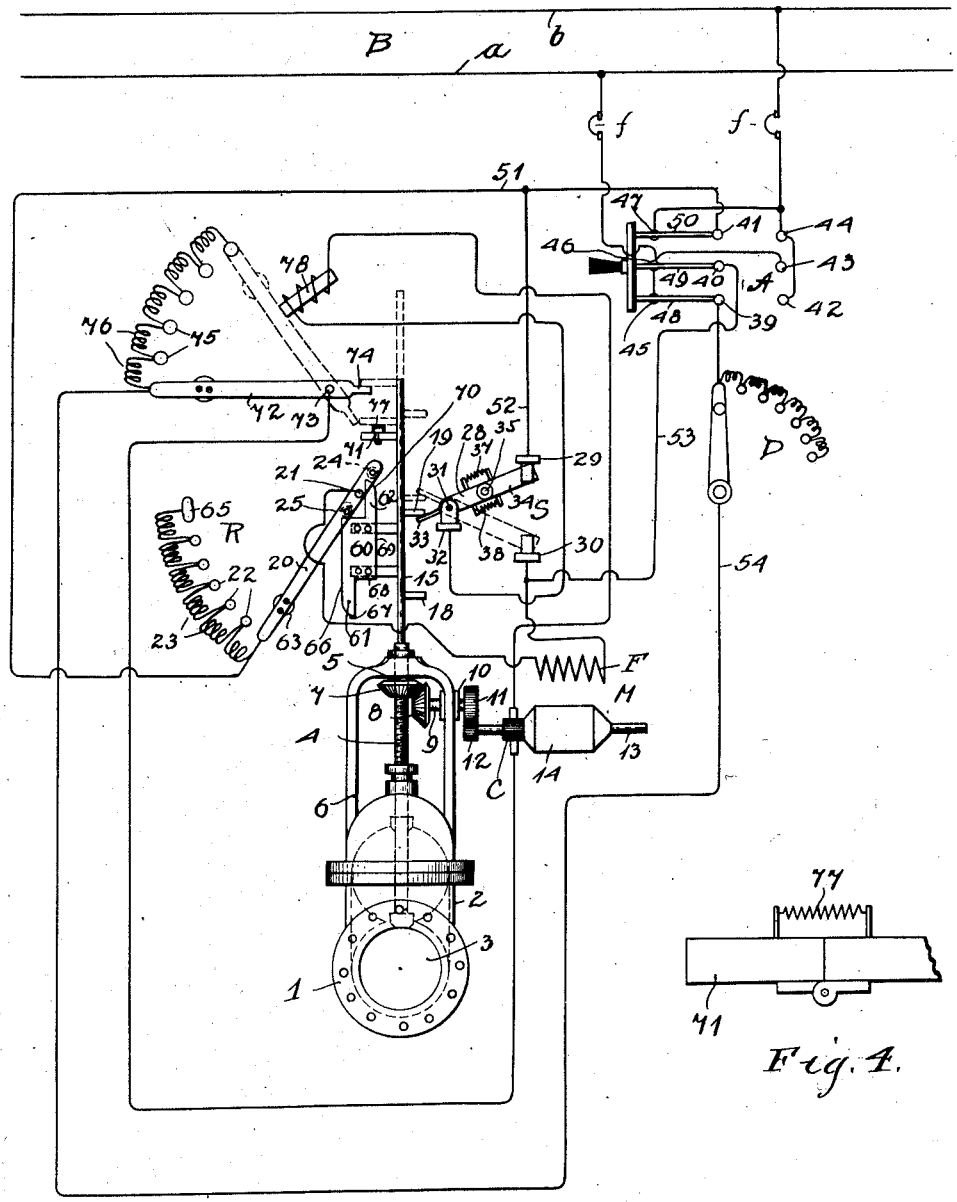

My invention will be best understood by reference to the accompanying drawings which diagrammatically illustrate its adaptability, and in which Figure 1 shows a very simple arrangement of electrical mechanism controlled upon motion of the valve. Figs. 2 and 3 show somewhat modified arrangements of electrical apparatus and circuits, and Fig. 4 is an enlarged view showing a mechanical arrangement used.

In the systems which I will describe is shown a direct current shunt motor M although any kind of motor, either direct or alternating current, may be employed. I have shown the valve mechanism to be controlled as consisting of the main channel 1 and the gate chamber 2 for receiving the gate 3 upon opening of the valve. The valve stem 4 is threaded and extends upwardly through the threaded bushing 5 supported on the bridge 6 extending from the valve body. Secured to the bushing 5 is the bevel gear 7 adapted to mesh with the bevel gear 8 secured on the shaft 9 extending through the bearing 10 and terminating in the gear 11 in meshing engagement with the pinion 12 secured to the armature shaft 13 which supports the armature 14. Above the valve stem in Fig. 1 is shown a rod 15 from which extend the actuating arms 16 and 17 from one side and the actuating arms 18 and 19 from the other side, the rod moving up or down as the valve stem is raised or lowered upon rotation of the motor armature. The arms 16 and 17 control the actuation of the rheostat R, while the arms 18 and 19 control the operation of the switch S. The rheostat arm 20 is pivoted at 21 and adapted at its end for engagement with the contact buttons 22—22 bridged by the resistance sections 23—23. Extending from the other end of the rheostat arm is the extension 24 disposed in the path of the arm 17, and a stud or pin 25 extending from the rheostat arm at the opposite side of the pivot 21 is adapted for engagement with the arm 16. The tension spring 26 tends to retain the arm 20 in its lowermost position against the stop 27.

The switch mechanism S consists of the switch arm 28 and the jaws 29 and 30. The switch arm 28 is pivoted at 31 to the pivot frame 32 and the extension 33 from the end of the arm is disposed between the arms 18 and 19, and when engaged by the arm 19 the switch arm will be moved into engagement with the jaw 29 and if engaged by the arm 18 the switch arm will be moved into engagement with the jaw 30. This switch may be of the quick break type and the engaging blade 34 may be pivoted at 35 to the body 28 of the arm and springs 37 and 38 connected between these parts at either side thereof as shown. The body part of the arm will therefore move first and when the force of the corresponding spring is overcome the blade will be quickly disengaged from one contact jaw and quickly engaged with the other to decrease sparking.

The electrical connections for the apparatus in Fig. 1 are as follows: the main controlling switch A actuated by the attendant consists of the middle contact posts 39, 40 and 41, the closing position contact jaws 42, 43 and 44 and the opening position jaws 45, 46 and 47 adapted to be engaged by the switch blades 48, 49 and 50. The contact jaws 45, 46 and 43 are connected together and with the line limb $a$ of the supply circuit B, and the contact jaws 42, 44 and 47 are connected together and with the line limb $b$. Fuses $f$ may be introduced in these connections. The contact post 41 connects through the conductor 51 with one end of the series of resistance sections 23 of the rheostat R and a branch conductor 52 leads to the jaw 29 of the switch mechanism S. The middle contact post 40 connects through the conductor 53 with the contact jaw 30 and from there through the field coil F of the motor M with the rheostat arm 20. The middle contact post 39 connects through the conductor 54 with the commutator C of the motor and from there with the pivot post 32 of the switch mechanism S. Starting rheostat D may also be provided for the motor and inserted in the conductor 54.

The drawing shows the valve closed and the switch A thrown to the opening position and the resistance of the starting box D cut out of circuit, as when the motor is running. Current now flows from the line limb $a$ to the switch jaws 46 and 45. Part of the current flows through the switch blade 49, through the conductor 53, through the field winding F, through the rheostat arm 20, through the conductor 51, through middle switch post 41 and through the switch blade 50 to the engaged contact jaw 47 and then to the line limb $b$. The remaining current flows from the contact jaw 45 to the switch blade 48, thence through starting box D, conductor 54, and the motor armature to the pivot post 32, through the switch arm 28, conductor 52 to conductor 51 and from thence to the line limb $b$. The armature and field on the motor are thus in parallel and the resistance of the rheostat R ineffective. The motor thus has a very powerful torque and slow speed and will be gradually accelerated and the valve gate gradually started to open the valve. This strong torque is necessary as the friction of rest of the valve gate may be very great and the speed during starting of the valve should be slow to allow the water to gradually assume its proper flow through the opening to prevent water hammer or other destructive forces which might result owing to the great inertia of the water. As the valve stem, however, moves upwardly upon rotation of the motor the rod 15 will be raised and the arm 17 extending therefrom moved to allow the spring 26 to pull the rheostat arm 20 downwardly to gradually include the resistance sections 23 in the field circuit. The speed of the motor is, therefore, gradually accelerated and when all the resistance is in circuit the motor will be at full speed and will continue so until the valve is almost entirely open. At this point the arm 16 will come into engagement with the pin 25, and the arm 20 will be returned to its normal upper position to gradually remove the resistances 23 from circuit, thus causing the speed of the motor to be gradually reduced. Just before the arm 20 has reached its normal upper position the arm 18 will engage the extension 33 from the switch arm 28, and when the arm 20 has reached its normal position the blade 34 of the switch will be snapped into engagement with the contact jaw 30. Upon this position of the switch arm a short circuit may be traced about the armature as follows: from the armature to the pivot post 32, to the switch arm 28, contact jaw 30, conductor 53, middle contact post 40, switch blade 49, switch jaws 46 and 45, switch blade 48, conductor 54, and back to the armature, and the motor will be stopped, the valve being entirely open.

When it is desired to close the valve the attendant throws the switch blades of the switch A into engagement with the contact jaws 42, 43, and 44, having first introduced the resistance of the starting box D into circuit. The short circuit about the armature is now open and the current flow through the armature will be reversed thus causing reversal of the motor. The starting box D is gradually cut from circuit and current will flow through the armature as follows: from the line limb $a$ to contact jaws 46 and 43, from the latter through switch blade 49, conductor 53, switch blade 28, pivot contact 32, through the armature winding, through the conductor 54, switch blade 48, contact jaws 42 and 44 and to the line limb $b$. The circuit through the field winding and rheostat arm 20 from the conductor 53, however, remains in the same direction as before. All the resistance of the rheostat R being initially removed from circuit, the motor and the valve controlled thereby are started powerfully and slowly, and upon descent of the valve stem and the rod 15 controlled thereby the arm 16 will be moved to allow the spring 26 to move the arm 20 over the contact buttons 22 and the speed of the motor will be gradually accelerated, and full speed of the motor will be maintained until the arm 17 again comes into contact with the extension 24 from the rheostat arm 20, whereupon the arm 20 will be returned toward its normal position to gradually remove the resistance sections 23 from circuit and to gradually reduce the speed of the motor at the end of the closing stroke of the valve gate, and the valve gate is slowly and powerfully moved into its final closing position thus preventing sudden interruption of the water flow and the consequent destructive results which might otherwise happen. Upon engagement of the arm 19 with the extension 33 from the switch arm 28 the blade 34 will be snapped into engagement with the contact jaw 29 at the time when the rheostat arm 20 has returned to its normal position, and the armature will be again short-circuited through the following path: from the armature through the pivot contact 32, switch arm 28, jaw 29, conductor 52, conductor 51, through the switch blade 50, contact jaws 44 and 42, switch blade 48 and through conductor 54 to the armature. Thus the motor is automatically controlled to slowly and powerfully start the valve and to slowly and powerfully move the valve at the ends of its stroke and the motor circuits are automatically controlled to stop the motor at the proper instant. The station at which the controlling main switch A is located may thus be at considerable distance from the valve and its position indicates at all times whether the valve is open or closed.

The starting box D may be automatic in character according to the well known practice in the art, or it may be omitted and the motor constructed so that it may be directly thrown upon the main circuit.

The arrangement shown in Fig. 1 although very simple and efficient under proper conditions has the disadvantage that the switch arm 20 has a tendency to return to its normal position upon derangement or breakage of the actuating parts, and the resistance in this case might be included in the motor circuit during the entire movement of the valve gate which will then have the same high speed at the ends of the stroke as during the intermediate movement and injurious effects follow: In Fig. 2 is shown a modified arrangement which will overcome this disadvantage, there being a tendency for the resistance arm to return to its normal position to disconnect the resistance from circuit. Instead of the arms 16 and 17 shown in Fig. 1, I have shown a plate 60 in Fig. 2 having the extensions 61 and 62 from diagonally opposite corners as shown. The rheostat arm 20 is pivoted at 21 and has the extensions 24 and 25. A spring such as in Fig. 1 may be used, or as shown in Fig. 2 a weight 63 is secured to the rheostat arm tending to hold it in position to remove all resistance from the field circuit. In this position the extension 25 engages at the edge of the surface 64 at the top of the contact plate 60. Upon starting of the motor by proper closure of the switch A the valve and valve stem are started upwardly and the arm 20 is immediately rotated about its pivot 21 and such rotation continues until the end of the arm engages the last resistance contact button 65, and when this position is reached the extension 25 will have passed over the end of the surface 64 and will be in engagement with the edge 66 of the plate 60. As the plate continues its upward motion there will be no further movement of the arm 20 until the end 67 of the edge 66 is reached, when the extension 25 will be released, the ends 67 being curved to form a track for this extension 25. Upon being thus released the arm 20 immediately returns to its normal position to remove the resistance from circuit to cause slow motion of the motor and of the valve driven thereby, and the point at which such slow motion begins can be determined by proper adjustment of the actuating mechanism for the rheostat arm. When the arm has returned to its normal position, as just described, the end of the lower edge 68 of the contact plate 60 is in position over the extension 24, and upon actuation of the main switch A to its reverse position the motor will start in reverse direction, the armature switch S having been actuated upon engagement with the extension 18. Upon starting of the valve gate to close the valve the arm 20 is again rotated until it reaches the last contact 65, when the extension 24 will travel along the edge 69 until the rounded end 70 is reached, when the arm will be released to its normal position as shown. During the remainder of its operation the motor will run slowly to cause closure of the valve, and when the extension 19 engages the switch S the armature will be short-circuited, and the motor stopped. With this arrangement in Fig. 2 should any break occur or any other derangement the rheostat arm will be returned to its normal position and the motor will run at slow speed.

In some instances it might be impossible by the use of resistance in the field circuit alone to obtain sufficient variation in the speed of the motor to permit of a sufficiently high ratio between the high speed during the major portion of the valve movement and the slow speed thereof during closing. Under these circumstances a supplementary resistance could be cut into the motor circuit at the end of the closing motion of the valve gate, this resistance being arranged to be included in circuit at a predetermined point near the end of the stroke, and cut out again when or shortly before the motor stops. It is quite necessary that this resistance be cut out before it is desired to again operate the valve, as serious trouble in starting the motor might otherwise be encountered. In many cases too it might be desirable to have the resistance cut out of circuit during the short interval while the valve is seating. In Fig. 3 is shown an arrangement in which both the armature and field circuits are controlled upon movement of the valve. The apparatus for controlling the field circuit may be the same as that shown in either Figs. 1 or 2, that of Fig. 2, however, being here shown. The valve stem is lengthened and is provided with an additional actuating arm 71. A rheostat arm 72 is pivoted at 73 and has the extension 74 for engagement with the arm 71. This rheostat arm is adapted to travel over the contact buttons 75 bridged by the resistances 76. The conductor 54 instead of passing directly to the armature connects with the first contact button, and the arm 72 connects with the armature terminal. The extension 71 is hinged, as shown more clearly in Fig. 4, and normally extended by means of the spring 77, and therefore upon upward travel of the valve stem as the arm 71 bends the rheostat arm will not be actuated but after the valve has been open and is subsequently actuated toward the closing position the arm 71 will engage the extension 74 to cause all the resistances 76 to be gradually connected in the armature circuit, either just at the end of the closing movement or during an interval just before final seating of the valve. The exact interval during which the resistance is effective is determined by the disposition of the arm 71 and the extension 74, the arm 71 engaging the extension 74 at the proper time upon downward travel of the valve stem to connect the resistances in circuit and releasing the extension at the proper time to allow the rheostat arm to be moved to its normal position to remove the resistances from circuit. Instead of having the rheostat arm held in its actuated position and subsequently released by the arm 71 an electromagnet 78 might be employed for holding the arm in position after it has been moved across the resistances by the arm 71, and release it upon actuation of the armature switch S to break the circuit in the magnet which would be included in the conductor 54. With this arrangement, however, the resistances 76 would not be removed from circuit until the valve had been seated. Upon upward travel of the valve stem, of course, there would be no actuation of the rheostat arm 72 owing to the spring hinged arm 71 which would merely swing down and pass by the extension 74. It is evident that this means for controlling the armature current at the proper time could be used independently of the field controlling mechanism.

As before stated, the motor may be of any appropriate design either for direct or for alternating current, and the controlling resistances or impedances would be adjusted accordingly, the main feature of the invention, however, being the provision of a motor for actuating the valve in which the speed of the motor and valve gate is automatically controlled so as to prevent danger from water hammer and other destructive effects which would arise through improper speed in opening or closing of the valve and great force is provided for starting the valve gate from its seat. The starting speed and acceleration of the motor, of course, would in each case be determined so as to be suitable for the particular valve to be controlled.

The application of my invention shown more or less diagrammatically in the drawings shows the principle of the invention, but I do not wish to be limited to these arrangements shown as many other arrangements might be resorted to without departing from the spirit of the invention as before stated and other power than electric power may be utilized for operating the valve.

What I claim as new and desire to secure by Letters Patent is:

1. In valve operating mechanism, the combination with a valve to be controlled, of driving mechanism associated with the valve, automatic controlling mechanism for said driving mechanism, means upon initial starting of said driving mechanism for causing the valve to be started slowly and with great force per unit of force applied to the mechanism, and means upon actuation of said valve for controlling said automatic mechanism to cause the driving mechanism to move the valve faster.

2. In valve operating mechanism, the combination with a valve to be controlled, of driving mechanism connected with the valve stem and adapted upon actuation to cause opening or closure of the valve, automatic controlling mechanism having connection with the valve stem and disposed upon initial starting of the driving mechanism to cause the driving mechanism and the valve to start slowly and powerfully, and means upon movement of said valve and valve stem for causing actuation of the controlling mechanism to cause acceleration of the driving mechanism and the valve.

3. In valve operating mechanism, the combination with a valve to be controlled, of driving mechanism connected with the valve stem and adapted upon actuation to cause opening or closure of the valve, automatic controlling mechanism having connection with the valve stem and disposed upon initial starting of the driving mechanism to cause the driving mechanism and the valve to start slowly and powerfully, means upon movement of said valve and valve stem for causing actuation of the controlling mechanism to cause acceleration of the driving mechanism and the valve, and means for automatically stopping the driving mechanism after the valve has been sufficiently actuated.

4. In a valve controlling system, the combination with the valve to be controlled, of an electric motor connected with the valve gate, a supply circuit for the motor, rheostat mechanism for the motor having mechanical connection with said valve gate, said rheostat mechanism upon initial connection of the motor with the supply circuit being disposed to allow current flow to cause the motor and the valve gate to start slowly and powerfully and with greatest torque per ampere, means upon starting of the valve gate for causing actuation of the rheostat mechanism to change the circuit conditions to cause acceleration of the motor and valve gate, means after a predetermined distance of travel of the gate for causing the rheostat to be actuated to again cause the motor to run slowly and powerfully, and with greatest torque per ampere and switch mechanism also having mechanical connection with the valve gate and adapted at the end of the valve gate travel to change the circuit conditions to stop the motor.

5. In a valve controlling system, the combination with the valve to be controlled, of an electric motor connected with the valve gate, a supply circuit for the motor, rheostat mechanism connected with the motor and having mechanical connection with the valve gate, switch mechanism also connected with the motor and having mechanical connection with the valve gate, said rheostat mechanism upon initial connection of the motor with the supply circuit being disposed to allow current flow to cause the motor and the valve gate to start slowly and powerfully, means after starting of the valve gate for moving the rheostat mechanism to change the circuit conditions whereby the motor speed is accelerated, means after a predetermined distance of travel of the valve gate for causing the rheostat mechanism to be returned to its normal position to cause the motor to again run slowly and powerfully, and means when the valve reaches the end of its stroke for causing actuation of said switching mechanism to change the motor circuit conditions whereby the motor is stopped.

6. In a valve controlling system, the combination with the valve to be controlled, of an electric motor connected with the valve gate, an armature winding and a field winding for said motor, a supply circuit for said windings, rheostat mechanism connected with the field winding, said rheostat mechanism upon initial connection of the motor with the supply circuit being disposed to allow current flow through the field winding to cause the motor and the valve gate to start slowly and powerfully, means after starting of the valve gate for automatically causing actuation of the rheostat mechanism to change the circuit conditions whereby the motor is accelerated, and means after a predetermined distance of travel of the valve gate for automatically causing actuation of the rheostat mechanism to its normal position whereby the motor again runs slowly and powerfully.

7. In a valve controlling system, the combination with the valve to be controlled, of an electric motor connected with the valve gate, an armature winding and a field winding for said motor, a supply circuit for said windings, rheostat mechanism connected with the field winding, said rheostat mechanism upon initial connection of the motor with the supply circuit being disposed to allow current flow through the field winding to cause the motor and the valve gate to start slowly and powerfully, means after starting of the valve gate for automatically causing actuation of the rheostat mechanism to change the circuit conditions whereby the motor is accelerated, means after a predetermined interval of increased speed of the motor and valve gate for automatically returning the rheostat toward its normal position whereby said motor is gradually retarded, and electrical means thereafter automatically actuated to change the motor circuit conditions to stop the motor.

8. In a valve controlling system, the combination with the valve to be controlled, of an electric motor connected with the valve gate, an armature winding and a field winding for said motor, a supply circuit for said windings, rheostat mechanism connected with the field winding, said rheostat mechanism upon initial connection of the motor with the supply circuit being disposed to allow current flow through the field winding to cause the motor and the valve gate to start slowly and powerfully, means after starting of the valve gate for automatically causing actuation of the rheostat mechanism to change the circuit conditions whereby the motor is accelerated, means after a predetermined interval of increased speed of the motor and valve gate for automatically returning the rheostat toward its normal position whereby said motor is gradually retarded, and electrical means thereafter for automatically short-circuiting the armature windings to stop the motor.

9. In a valve controlling system, the combination with the valve to be controlled, of an electric motor connected with the valve gate, a supply circuit for the motor, an armature winding and a field winding for the motor, rheostat mechanism connected with the field winding and being in mechanical association with the valve gate, said rheostat mechanism upon initial connection of the motor with the supply circuit being in position to adjust the current flow through the field winding to cause the motor and the valve gate to be started slowly and powerfully, means upon movement of the valve gate for causing the rheostat to be actuated to gradually adjust the current flow through the field winding to cause the motor to accelerate and to attain maximum speed, means after an interval of maximum speed motion of the motor and valve gate for actuating the rheostat toward its normal position whereby the motion of the motor and valve stem is retarded, switch mechanism connected with the armature winding, and means after retardation of the motor for automatically actuating the switch mechanism to short-circuit the armature winding whereby the motor is stopped.

10. In a valve controlling system, the combination with the valve to be controlled, of an electric motor connected with the valve gate, a supply circuit for the motor, an armature winding and a field winding for said motor, rheostat mechanism controlling the current flow from the supply circuit to said field winding, an electrical switch controlling the armature circuit and normally disposed to connect the armature with the supply circuit, said rheostat mechanism being normally disposed to adjust the current flow through the field winding to cause the motor and the valve gate to be started slowly and powerfully, means after starting of the motor and valve gate for automatically causing actuation of the rheostat to change the current flow through the field winding and to cause the motor to accelerate toward maximum speed, means after a predetermined distance of travel of the valve gate under maximum speed for automatically causing actuation of the rheostat mechanism to retard the motor, and means after such retardation for automatically actuating said electrical switch mechanism to short-circuit the armature winding whereby the motor is stopped.

11. In a valve controlling system, the combination with the valve to be controlled, of a motor connected with the valve, an armature winding and a field winding for said motor, a supply circuit, a main switch controlling the current flow through said motor and for controlling the direction of current flow through the armature, rheostat mechanism for the field winding having mechanical connection with the valve, a second switch controlling the armature circuit and having mechanical connection with the valve, said main switch and second switch being normally disposed to connect the armature with the supply circuit, said rheostat being normally disposed to adjust the current flow through the field winding to cause the motor to start the valve slowly and powerfully, means after starting the valve for actuating the rheostat to gradually increase the speed of the motor until full speed is reached, means after a predetermined distance of travel of the valve for actuating the rheostat mechanism to adjust the current to retard the motor whereby the valve is again moved slowly, and means thereafter for automatically actuating the second switch to disrupt the armature connection with the main circuit and to short-circuit said armature to stop the motor, actuation of the main switch thereafter causing opening of the short circuit, reconnection of the armature with the supply circuit and reversal of current flow through the armature whereby the motor will subsequently be started in a reverse direction.

12. In valve operating mechanism, the combination with a valve to be controlled, of an electric motor connected with the valve, an armature and a field winding for said motor, a double throw main switch for connecting said motor circuit with a supply circuit, and an auxiliary switch for the armature circuit, said auxiliary switch in a first position causing said armature to be connected with the main switch and during a second position to disconnect the armature from the main switch and to short-circuit the armature, one position of the double throw main switch during the first position of the auxiliary switch causing the armature to be connected with the supply circuit, the other position of the double throw switch during the second position of the auxiliary switch causing said short-circuit about the armature to be opened and the armature connected with the supply circuit but in reverse direction.

13. In a valve operating mechanism, the combination of a valve an electric motor for opening and closing the valve, of an armature and a field winding for the motor, a main switch for connecting the armature and field winding with a supply circuit, an auxiliary switch for the armature circuit adapted in one position to connect the armature with the main switch and supply circuit and in another position to disconnect the armature from the supply circuit and to short-circuit the armature to stop the motor, and mechanical means associated with the valve and with said auxiliary switch for causing actuation of said switch to short-circuit the armature when the valve has been moved a sufficient distance by the motor.

14. In valve operating mechanism, the combination with a valve to be operated, of an electric motor for driving the valve to be operated, of an armature and a field winding for the motor, a reversing switch for connecting the motor windings with a main circuit, and an auxiliary switch for the armature circuit normally in position to connect the armature with the supply circuit through the reversing switch, said auxiliary switch being mechanically controlled by the movement of the valve in one direction to disconnect the armature from the supply circuit and to short-circuit the armature when the valve has moved a sufficient distance in said direction whereby the motor is stopped, the circuit conditions being changed upon actuation of the reversing switch to its other position to open said short circuit and to reconnect the armature with the supply circuit but in the opposite direction whereby the motor is caused to drive the valve in an opposite direction, said auxiliary valve being again mechanically controlled by the moving valve when the valve is moved a sufficient distance in the opposite direction to again short circuit the armature to stop the motor.

15. In a valve controlling system, the combination with a valve, of an electric motor for driving said valve, of an armature and a field winding for the motor adapted for connection with a main supply circuit, switching mechanism for controlling the armature circuit, means upon movement of the valve in either direction for causing the switching mechanism to be automatically actuated to short-circuit the armature to stop the motor when the valve has traveled a sufficient distance in one direction, and additional switching mechanism for opening said short circuit and for connecting the armature with the main circuit in reverse direction.

16. In a valve controlling system, the combination with a valve to be controlled, of an electric motor for moving the valve to be controlled, of winding for the motor adapted for connection with a main supply circuit, switching mechanism for the windings, means upon movement of the valve in either direction for automatically causing actuation of the switching mechanism to short-circuit the windings to stop the motor when the valve has moved a sufficient distance in one direction, and additional switching mechanism for opening said short circuit and for causing current flow in reverse direction through said windings whereby the motor is reversed and the valve operated in reverse direction.

17. In a valve controlling system, the combination with a valve to be controlled, of a motor for opening and closing the valve, an armature winding for the motor adapted for connection with a main supply circuit, resistance associated with the armature circuit, and means controlled by the movement of the valve to include said resistance in the armature circuit during the end portion of the stroke of the valve and for automatically removing said resistance from the circuit during final seating of the valve.

18. In a valve controlling system, the combination with a valve to be controlled, of a motor for opening and closing the valve, an armature winding for the motor adapted for connection with a main supply circuit, resistance associated with the armature circuit, means controlled by the movement of the valve to include said resistance in the armature circuit during the end portion of the stroke of the valve and for automatically removing said resistance from the circuit during final seating of the valve, and switching mechanism also controlled by the movement of the valve for short-circuiting the armature to stop the motor when the valve is seated.

19. The combination with a motor driven valve of a hand switch to control the current flowing to the motor, an automatic switch in the armature circuit, means to actuate the said automatic switch as the valve approaches the end of its stroke, an automatic rheostat switch in the field circuit of the motor, and means for introducing the rheostat into the field circuit after the valve has been moved a predetermined distance from the beginning of its stroke and again withdrawing the rheostat as the valve approaches the end of its stroke.

20. In valve operating mechanism, the combination with a valve, of driving mechanism for opening and closing the gate thereof, and means for automatically controlling said driving mechanism so that it will move the gate more slowly and with increased force per unit of force applied to the mechanism for predetermined distances of travel at the ends of its strokes.

21. In valve operating mechanism, the combination with a valve, of driving mechanism for causing opening or closing of the gate thereof, and means for automatically controlling said driving mechanism so that it will move the gate more slowly during the latter part of the closing movement of the gate and will operate with increased force per unit of force applied to the mechanism during the earlier portions of the movement of the gate.

22. In valve operating mechanism, the combination with a valve, of driving mechanism for opening or closing the gate thereof, and automatic means whereby the driving mechanism is constrained to produce slow movement with greatest force per unit of force applied to the mechanism during predetermined periods at the ends of the strokes and more rapid movement during the other portions of the strokes.

23. In valve operating mechanism, the combination with a valve, of driving mechanism for opening and closing the gate thereof, and automatic means whereby the driving mechanism is constrained to start the gate with slow movement and greatest force per unit of force applied to the mechanism during predetermined distances of travel and to move the gate more rapidly during predetermined distance of travel thereafter and during the closing portion of the movement of the gate to move it with great slowness and correspondingly greater force per unit of force applied to the mechanism.

24. In valve operating mechanism, the combination with a valve to be controlled, of driving mechanism associated with the valve, automatic controlling mechanism for said driving mechanism, means upon initial starting of said driving mechanism for causing the gate to be started slowly and with great force and means upon actuation of said gate for controlling said automatic mechanism to cause the driving mechanism to move the gate faster and means upon further actuation of said gate for controlling said automatic mechanism to cause the driving mechanism to operate the gate more slowly and with great power and stop it at the end of its stroke.

25. In valve operating mechanism, the combination with a valve to be controlled, of driving mechanism connected with the valve stem and adapted upon actuation to cause opening or closing of the gate of the valve, automatic controlling mechanism having connection with the valve stem and disposed upon initial starting of the driving mechanism to cause the driving mechanism and the gate to start slowly and with great force, and means upon movement of said gate and valve stem for causing actuation of the controlling mechanism to cause acceleration of the driving mechanism and the gate, and upon further movement of said gate and valve stem to cause retardation and final stopping of the driving mechanism and the gate.

26. In valve operating mechanism, the combination with a valve to be controlled, of driving mechanism connected with the valve stem and adapted upon actuation to cause opening or closing of the gate of the valve, automatic controlling mechanism having connection with the valve stem and disposed upon initial starting of the driving mechanism to cause the driving mechanism and the gate to start slowly and with great force, means upon movement of said gate and valve stem for causing actuation of the controlling mechanism to cause acceleration of the driving mechanism and the gate and means for stopping the driving mechanism after the gate has been sufficiently actuated.

27. In valve controlling mechanism, the combination with a valve to be controlled, of a motor associated with the valve to cause the movement of the gate thereof, a source of power connected with said motor, automatic controlling apparatus, said controlling apparatus upon connection of said motor for operation being adapted to cause said motor to move the gate more slowly and with greatest force per ampere for predetermined distances of travel at the ends of the strokes.

28. In valve controlling mechanism the combination with a valve to be controlled, of a motor associated with the valve to cause movement of the gate thereof, a source of power connected with said motor, automatic electric controlling apparatus, said controlling apparatus upon connection of said motor for operation being adapted to cause said motor to move the gate slowly during the latter part of the closing movement of the gate and to operate slowly and with greater force per ampere during the earlier portions of the movement of the gate.

29. In valve controlling mechanism, the combination with a valve to be controlled, of a motor associated with the valve to cause movement of the gate thereof, a source of power connected with said motor, automatic controlling apparatus, said controlling apparatus upon connection of said motor for operation being adapted to cause said motor to cause slow movement of the gate with greatest force per ampere during predetermined intervals at the ends of the strokes and more rapid movement during the other portions of the strokes.

30. In valve controlling mechanism, the combination with a valve to be controlled, of a motor associated with the valve to cause movement of the gate thereof, a source of power connected with said motor, automatic controlling apparatus, said controlling apparatus upon connection of said motor for operation being adapted to cause said motor to start the gate with greatest force per ampere and slow movement for predetermined intervals of the strokes and to move the gate more rapidly during predetermined distances of stroke thereafter, and during the latter portion of the closing stroke to cause the gate to move with very great slowness and with high torque per ampere.

31. In valve controlling mechanism, the combination with a valve to be controlled, of a motor associated with the valve to cause movement of the gate thereof, a source of power connected with said motor, automatic controlling apparatus for said motor, means upon initial starting of said motor for causing the gate to be started slowly and with greatest force per ampere and means upon actuation of said gate for controlling said automatic mechanism to cause the motor to move the gate faster and then to retard its motion and gradually stop it.

32. The combination with a motor driven valve, of a hand controller to connect the motor to its source of power, an automatic controller in the power line, means to actuate said automatic controller so that when the motor is first connected for operation the gate of the valve will be started slowly and with greatest force per ampere, will then be accelerated, then moved at maximum speed and then gradually slowed down and stopped.

33. In valve-operating mechanism, the combination with a valve, of driving mechanism for causing opening or closure thereof, and means for automatically controlling said driving mechanism to move the valve slowly at the ends of its strokes and with increasing force per unit of force applied to the mechanism for decreasing speeds.

34. In valve-controlling mechanism, the combination with a valve to be controlled, of driving mechanism for the valve, and automatic means controlled by the actuation of the valve for causing said driving mechanism to be moved slowly and with great force per unit of force applied to start the valve from a state of rest and to thereafter accelerate the movement of the valve.

35. In valve-controlling mechanism, the combination with a valve to be controlled, of an electric motor associated with the valve to cause movement thereof, a supply circuit for said motor, electrical controlling apparatus, said controlling apparatus upon connection of said motor in circuit being adapted to cause said motor to start slowly and with the greatest torque per ampere, whereby the valve is started slowly and powerfully from a state of rest, and means adapted upon starting of said valve for causing said controlling apparatus to cause acceleration of the motor and of the started valve.

In witness whereof, I hereunto subscribe my name this 28th day of September A. D., 1905.

WM. B. JACKSON.

Witnesses:
   Dora E. Casey,
   E. G. Hoefer.